Figure 1:
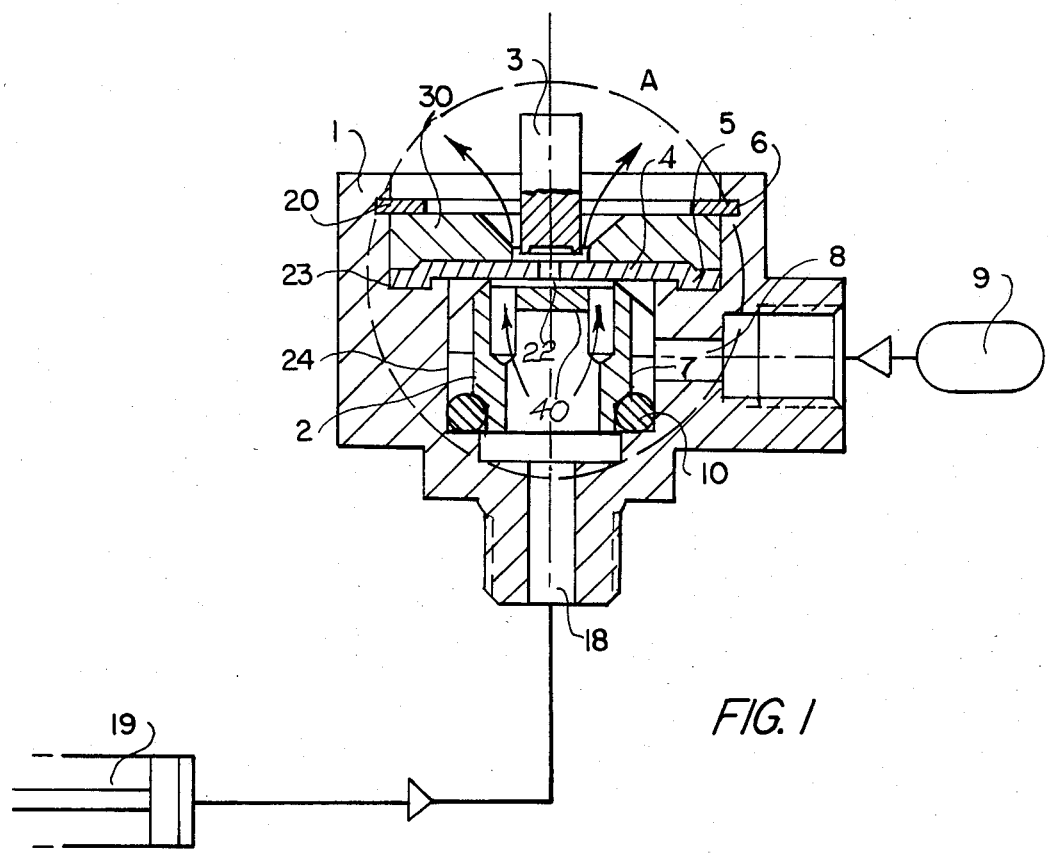

United States Patent [19]

Scholz

[11] Patent Number: 4,625,750
[45] Date of Patent: Dec. 2, 1986

[54] FORCE-CONTROLLED PRESSURE REGULATING VALVE

[76] Inventor: Joachim Scholz, An der Ziegelei 14, 7551 Bischweier, Fed. Rep. of Germany

[21] Appl. No.: 732,785

[22] Filed: May 9, 1985

[51] Int. Cl.[4] ............................................. G05D 16/06
[52] U.S. Cl. ................................ 137/116.5; 137/627.5
[58] Field of Search ........................... 137/116.5, 627.5

[56] References Cited

U.S. PATENT DOCUMENTS

| 3,578,024 | 5/1971 | Hill | 137/627.5 |
| 4,452,267 | 6/1984 | Ott | 137/116.5 |
| 4,499,921 | 2/1985 | Stoll | 137/627.5 |

Primary Examiner—Robert G. Nilson
Attorney, Agent, or Firm—Larson and Taylor

[57] ABSTRACT

The object of the invention is a force-controlled pressure regulating valve, wherein large flow areas can be opened in valves in a simple manner and likewise can be closed, using small operating forces and short setting paths. A valve member 2 is axially adjustable in a housing which is in permanent connection with a pressure medium inlet opening 8 and is blocked against a pressure medium output opening 18. Valve member 2 is configured as a hollow cylinder. Its one edge surrounds an opening leading to the output opening 18, and its other edge cooperates with a valve seat coaxial with a venting opening 20, and surrounds a second valve seat in the cover of valve member 2. A setting member 3 cooperates with this valve seat, which transmits the setting force for the valve member. This setting force counters a check force.

17 Claims, 6 Drawing Figures

FORCE-CONTROLLED PRESSURE REGULATING VALVE

The invention relates to a force-controlled pressure regulating valve especially for pneumatic systems of the type comprising a housing having a pressure medium inlet opening connected to a pressure medium source, a pressure medium output opening connected to a utilization device, and a venting opening, which leads to a low pressure medium, and a valve member, adjustable between two end positions, for connecting the pressure medium output opening either to the pressure medium inlet, when the venting opening is blocked, or to the venting opening, when the pressure medium inlet opening is blocked.

Such valves can serve in compressed air units to connect a weak mechanical control signal to a large-volume, proportional working current, This control signal can be fed to the pressure regulating valve mechanically, electromagnetically or in some special manner.

In many cases, such a pressure regulating valve is required so that the operational forces which are applied can remain small and no friction forces whatsoever need be overcome. Furthermore, a lever which may be used to transmit the operational forces should lift as little as possible, so that the lift-dependent forces are changed as little as possible during operation using an electromagnet. Furthermore, all movable and fixed parts in the valve should be free of friction, since friction forces negatively influence the switching behaviour of the valve, because they produce undesirable hysteresis.

To make the pressure regulating valve work efficiently, it is furthermore required that the part thereof functioning as inlet valve return to a certain rest position when no compressed air is flowing therethrough. Additional springs are customarily provided for this purpose.

Rapid build-up of the working pressure in a utilization device, e.g. a compressed cylinder, requires as large as possible valve opening areas in the valve housing. The same is true for the venting process, for then still larger valve opening areas are required, since venting occurs more slowly than entrainment, i.e., filling (pressurization), especially in the lowest pressure range.

In the present state of the art, such pressure regulating valves have mechanically operated control pistons and are guided in the valve housing and packed with friction packings against the working chamber lying thereunder. With application of a control force, a double seat valve is opened by the control piston which connects the supply chamber with the working chamber. This working pressure moves the control piston against the operational force and produces equilibrium. In this case the double seat valve closes, blocks off the supply chamber and prevents further throughput of the supply air into the working chamber.

Friction, which negatively influences the quality of regulation and requires additional return springs, is the main drawback here.

Another drawback is that the quality of regulation depends upon the dimensions of the control piston. The larger the control piston, the less the friction drops in inverse ratio with the weight. However, this means that the control forces change quadratically relative to the size of the diameter. Thus the control forces below a certain control piston size can no longer be applied by commercially available electromagnets, which greatly limits the usefulness of this type of valve.

One type of valve construction of the prior art pressure regulating valves is known as the fine-regulation valve, in which a compression spring can be tip-stretched over the control piston by a manual device, so that the output pressure can be changed and can be adjusted precisely relative to the known supply pressure.

Another type is the lever-operated regulation valve, such as are used, e.g., in hand brakes in vehicles. Here, a rotary or pivot movement is manually transformed by proportional output pressure, from a regulating device comparable with that above, into an output pressure proportional to the angle of rotation.

Another type of valve is an electromagnetically controlled pressure regulating valve wherein a spring-biased control piston is moved by the force of the electromagnets. They require an electro magent which applies as nearly as possible the same force over the control path. Known valves of this type are complicated in their construction and thus are costly to mnufacture and to use.

Also, in practice, they have a nominal diameter of only up to 4 mm, which is the maximum valve throughput diameter on the market. Servo-valves are used for larger nominal diameters.

Electromagnetically controlled two-way valves have no pressure regulating function and in their construction are completely different from force-controlled pressure regulating valves.

The object of the invention is to provide a force-controlled pressure regulating valve of the aforementioned type, in which large work areas are opened in the simplest manner with small operational forces and short operation paths.

The pressure regulating valve according to the invention is to work for the most part without friction, is composed of few parts, and allows a very rapid filling and venting of the working chamber, using quite simple means. Furthermore, the value is of such simple construction that the valve housing can even be spray-molded of plastic, and post-treatment is not required.

These objects are fulfilled by the invention essentially as indicated in claim 1. Further features and advantageous exemplary embodiments are given in the dependent claims.

The invention, in an advantageous manner, using simple means, simple and commercially available elastomer parts, and at minimum cost, provides a friction-free pressure regulating valve, which opens large working areas with little operational force, and indeed even without additional auxilliary means such as check springs and servo-valves. With simple construction of the valve housing, it is also possible that it can be fabricated of plastic, by the spray-molding process. Furthermore, very rapid venting of the work chamber is obtained by using an elastomer disk or diaphragm.

According to the invention, it is provided that the elastomers which are used each have several functions.

Thus, a control diaphragm which is arranged according to the invention beneath a control piston has the following functions:

to seal the housing cover against the valve housing, by serving as a seat for the part of the valve operating as inlet valve, and for the control pistons;

to form the working surface for the control piston.

A gasket according to the invention arranged between the part of the valve operating as inlet valve and the valve housing has the following functions:

to seal the supply chamber,
to control the inlet valve, and
to produce a closing force.

Figure 2:
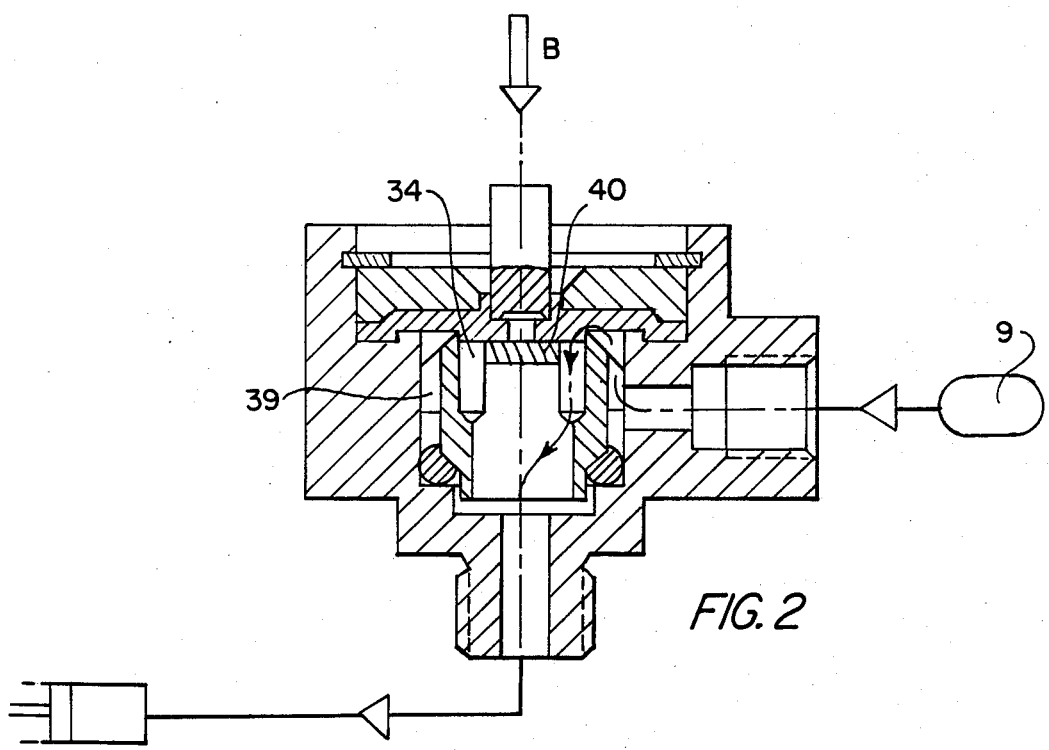
Figure 3:
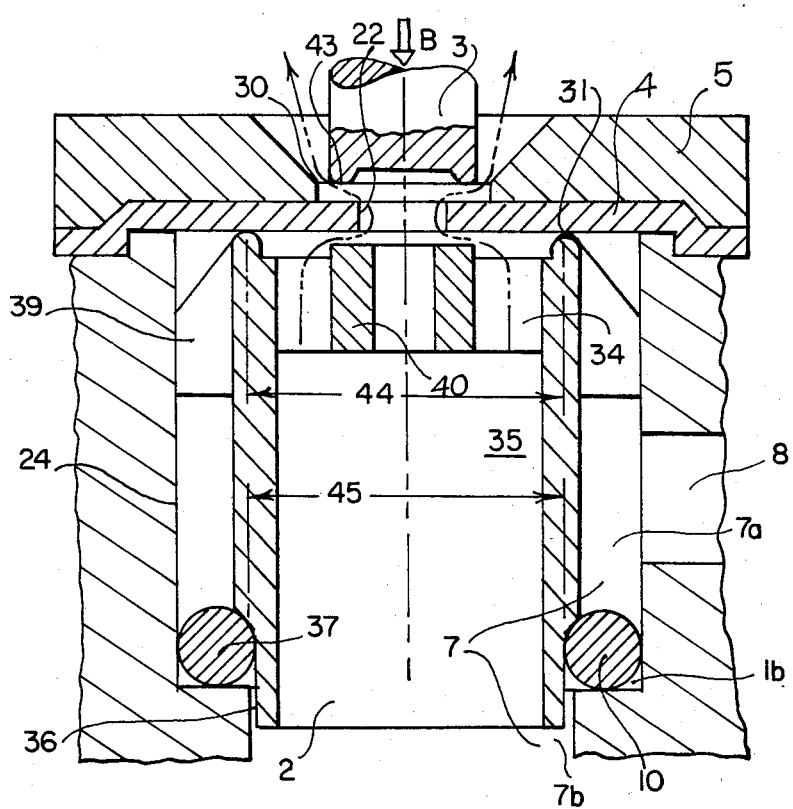

The invention is to be more clearly explained relative to the exemplary embodiments which are shown in the drawings. The drawings show:

FIG. 1, a middle lengthwise section of a first exemplary embodiment of the invention in the venting state, FIG. 2, the pressure regulating valve as in FIG. 1, but in the entrainment or filling state, FIG. 3, the part of the pressure regulating valve as defined by the line A in FIG. 1, shown here in larger scale.

Figure 4:
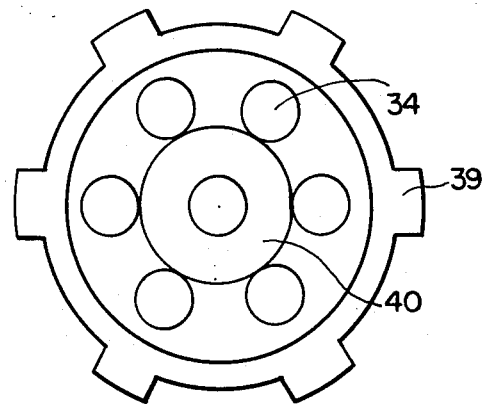
Figure 5:
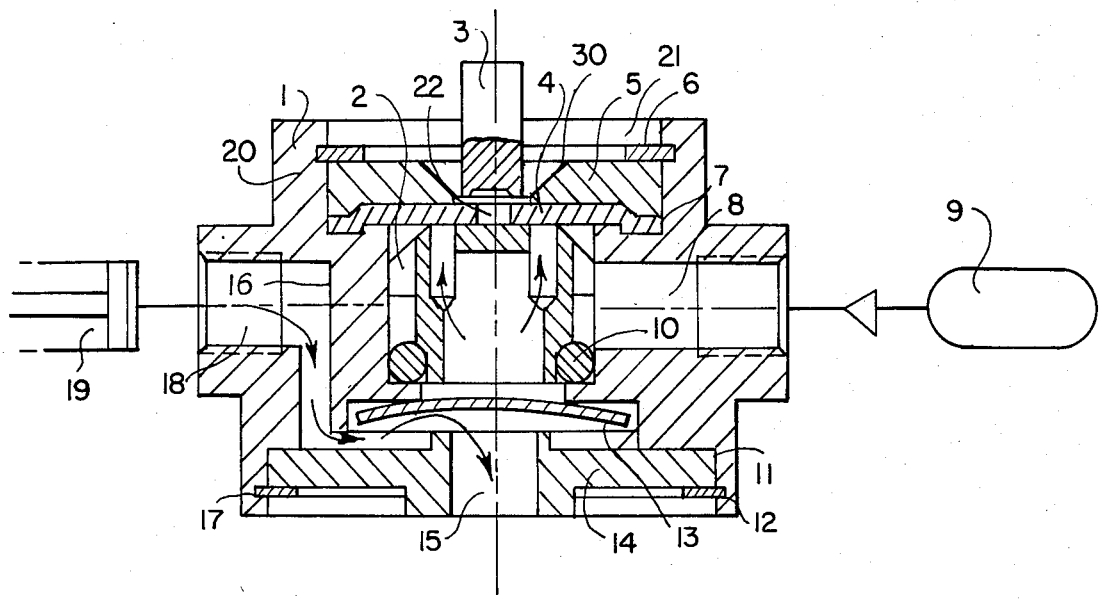
Figure 6:
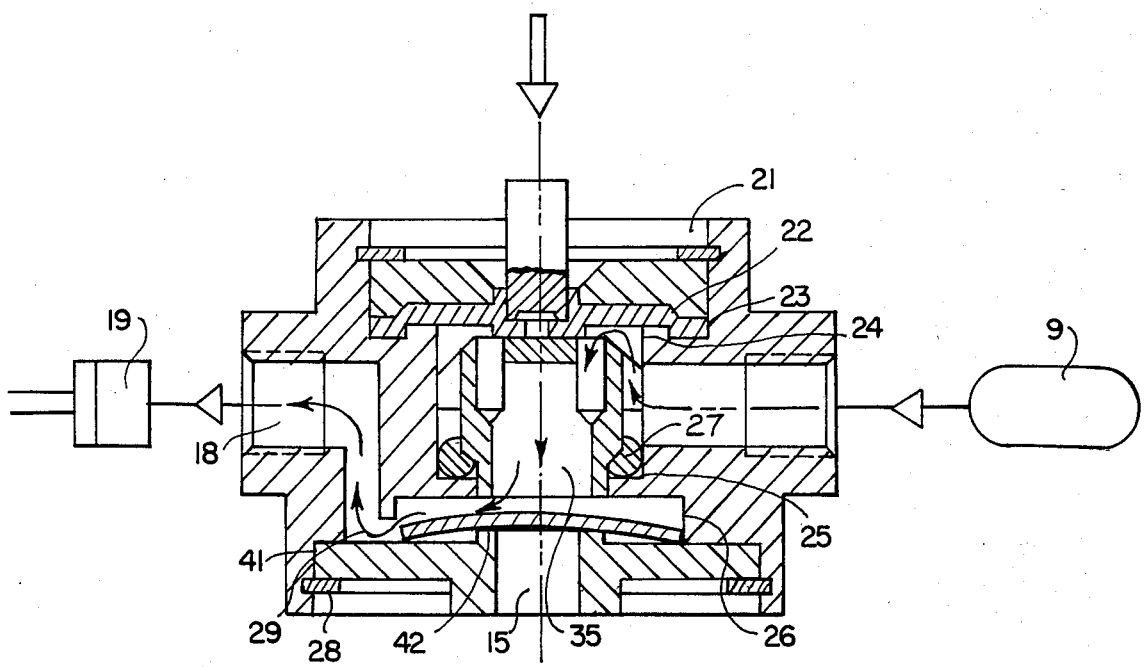

FIG. 4, a plan view of the valve member of FIG. 3,

FIG. 5, another exemplary embodiment of the invention, for attainment of short venting times, shown in the venting state, as in FIG. 1, and FIG. 6, the pressure regulating valve of FIG. 4, shown in the entrainment state.

The force-controlled pressure regulating valve according to the invention is arranged between a pressure medium source 9 of any fluid, especially a pneumatic fluid, for example a compressed air tank, and a utilization device 19, which may be the control cylinder of the compressed air brake of a vehicle (FIGS. 1, 2, 5, 6). Housing 1 of the pressure regulating valve has a pressure medium inlet 8, a first pressure medium output 18 to utilization device 19 and a second pressure medium output into the surrounding medium, for example into the surrounding air. The second pressure medium output will be described in some detail, but first it need only be noted that it consists of the radial play (spring) between a counterbore 30 and control piston 3 as a first pressure medium discharge opening and additionally can consist of a second pressure medium discharge opening 15 in housing 1 (FIG. 5).

When the valve is in operational position as shown in the entrainment position, pressure medium source 9 is connected through the valve with utilization device 19, in order to fill this with pressure fluid from pressure medium source 9, which may be compressed air. In another operational position of the valve fluid, shown as the venting position, utilization device 19 is attached to the surrounding medium in order to be vented. The valve thus block pressure medium source 9, to prevent it from being emptied.

The maximum pressure which can be produced in utilization device 19 by feeding pressure medium from pressure medium source 9 is the pressure rise provided in pressure medium source 9 itself. This pressure is fed into device 19 as a part of the pressure rise in source 9, and is dependent upon a force which as a control signal is applied to control piston 3 in the direction of the lengthwise axis itself, for example by means of an electromagnet.

A simple embodiment of the pressure regulating valve according to the invention is shown in FIGS. 1 and 2 in two different operational positions. The valve here has a valve housing 1 with pressure medium inlet 9 and pressure medium source 9. As already disclosed, pressure medium inlet 8 and pressure medium output 18 intersect at an angle of 90°. Pressure medium inlet 8 and pressure medium output 18 open into a supply chamber 7, which is coaxial with pressure medium output 18 in housing 1, is surrounded by a wall 24, and in part is a bore, which penetrates the housing from one to the other end, stepped inwards from both sides. Supply chamber 7 is closed by an elastomer diaphragm 4 on the end opposite pressure medium output 18, which engages on cover 5, which presses diaphragm 4 with its outside edges without any play into an annular groove 23 in housing 1. Cover 5 is held tight by means of a security ring 6 inserted in an annular groove 20 of housing bore section 21 in such a position in housing 1 that the control diaphragm is held in groove 23 without any play. Counterbore 30 is arranged axially parallel (coaxial) with supply chamber 7 in cover 5, and a bore 22 is likewise arranged in diaphragm 4 coaxial to supply chamber 7. The space surrounded by security ring 6 is definitely larger than the section of cylindrical supply chamber 7, and the section of bore 22 in diaphragm 4 is definitely smaller than the section of supply chamber 7; the smaller section of bore 30 is turned toward bore 22 and is larger than the section of bore 22; the larger section of bore 30 is turned toward security ring 6 and is smaller than the free space surrounded by this ring. The bores passing through housing 1 are stepped in from both ends so that the diameters decrease the individual bore sections, which simplifies assembly of the housing.

Valve member 2, which is essentially a cylindrical sheathing member, is arranged in supply chamber 7, and is closed at the top with a cover 40, and provided with projections 39 uniformly distributed around the outside periphery, by which valve member 2 is guided radially without play, while it remains axially adjustable in cylindrical supply chamber 7. As shown in FIG. 4, cover 40 has a number of axial bores 34 distributed uniformly around its periphery near its outside edge, as well as a central axial bore. Valve member 2 tapered includes a portion 36, and in the area of this tapered portion 36, valve member 2 is engaged an elastically flexible ring 10 on a collar 1b surrounding supply chamber 7. conical surface or section 37 is provided adjacent to tapered section 36 of the cylindrical wall of the valve member, and the angle of this conical surface 37 must be greater than the degree of friction between the material of ring 10 and the material of housing 1, in order to avoid clamping, i.e., impeding the movement of, the valve member.

Cover 40 of the valve member and the top edge of the cylindrical sheathing edge are shaped particularly as shown in FIG. 3. In the operational position shown in FIGS. 1 and 3, the valve member engages with its top rounded edge 31 as a gasket against the bottom of diaphragm 4. Pressure medium inlet 8 connects with the part 7a of supply chamber 7 over ring 10, but this part 7a is blocked by ring 10 and the engagement of valve member 2 with its edge 31 on the bottom of diaphragm 4 of pressure medium output 18. On the other hand, pressure medium output 18 is in communication, through part 7b of supply chamber 7 beneath ring 10, with the inside space 35 of valve member 2, which, through axial bores 34, the central bore, bore 22 of diaphragm 4, and the annular clearance between piston 3 and bore 30, is in communication with the medium surrounding the valve.

Thus the operational position of the valve shown in FIGS. 1 and 3 is the position in which utilization device 19 is vented. Fluid contained in device 19 can escape therefrom in the direction of the arrows of FIGS. 1 and 3, through the valve. Pressure medium source 9 is separated from device 19.

If utilization device 19 is to be entrained, i.e., pressurized, then it is to be connected with pressure medium source 9. In order to bring the valve into the suitable position, a control force of a degree corresponding to the pressure desired in device 19 is applied on control piston 3 directed against the valve (arrow B, FIG. 3). The control force directs piston 3 into the valve, until it comes to rest with its inside rounded edge 43 serving as a gasket on the inside free edge of diaphragm 4, and with further adjustment deforms this diaphragm inward. With further adjustment of the control piston, the axial play between control diaphragm and inner collar of cover 40 is overcome, and with still further adjustment of control piston 3, valve member 2 is adjusted inward, so that its edge 31 is removed from diaphragm 4. Engagement of control piston 3 on control diaphragm 4 terminates the venting state, and the annular clearance is blocked between the contour, piston 3 and the edge of bore 30. Lifting of valve member 2 from diaphragm 4 frees an annular clearance which connects part 7a of supply chamber 7, and also fluid inlet 8 through bore 34 with inside space 35 of valve member 2 and thus with pressure medium output 19. The fluid flow which occurs is represented by the arrows of FIG. 2; this operational position of the valve according to the invention is the entrainment or pressurizing position for device 19.

In inside space 35, a pressure is attained which corresponds to the control force applied on control piston 3, and if still more pressure fluid is fed in from inlet 8 so as to balance this force, then a state is reached in which valve space 35 is separated, i.e., cut off from, part 7a of supply chamber 7 and thus an equilibrium is created. Under these conditions, utilization device 19 is blocked or cut off from the output opening provided between control piston 3 and bore wall 30 and is also blocked from inlet 8. On the other hand, when pressure fluid is fed in through inlet 8 from pressure medium source 9, the pressure build-up in inside space 35 of valve member 2 exceeds the control force being applied from the outside on control piston 3, then control piston 3 is raised against the control force exerted thereon, and thus the pressure in utilization device 19 cannot exceed the pressure of the control force being applied on control piston 3. The adjustment value of the control force therefore actually determines the pressure in device 19. The control force affects a small area and the pressure fluid flow affects a large area in inside space 35 of the valve member. The pressure limitation in inside space 35 and in device 19 is thus traced back to the fact that during the inflow of fluid from the pressure medium source into inside space 35, it not only affects device 19, but also flows through the central opening of cover 40 and the coaxial opening 22 of control diaphragm 4 on the bottom of control member 3, and thus directly counters control force B. In known valve arrangements, such a connection is not provided in this operational position, and the pressure of the pressure fluid does not work directly against the control force in a comparable manner. Among known solutions are those disclosed in the following publications: DE-OS No. 16 73 488 and GB-PS No. 902 321.

The control force on control piston 3 is decreased for venting of utilization device 19; the piston is moved outward under the pressure in inside space 35; the inside edge of the control diaphragm follows and turns back as shown in FIGS. 1 and 3, and when the control piston is again moved outward, it is raised from the control diaphragm and disperses pressure fluid, until the state of weight equilibrium is reached again.

According to the invention, as illustrated in FIG. 3, the diameter, denoted 44, of the edge 31 which serves as valve seat of valve member 2 is identical to the diameter, denoted 45, of the annulus or ring defined by the line of contact between ring 10 and conical surface 37 of valve member 2.

If the diameters 44 and 45 are identical, then valve member 2 is in a state of weight equilibrium, i.e., is held balanced by the pressures on the inside and outside of the valve member and is prevented from prebiasing, i.e., preloading ring 10 when edge 31 is engagement with control diaphragm 4.

The valve according to the invention is very simple in its construction and method of operation and its guaranteed to operate properly. It uses only simple, low-wear structural components; it is accessible and can be manufactured quickly and with little material. Use of special machinery is not required. A slight control force which travels over short control paths is required for adjustment of the valve. The control force is applied by means of control piston 3, which frees the section of the valve periphery, so that when its entrainment position has been reached, and on account of the short flow path in the valve, utilization device 19 is entrained in an extremely short time, i.e., is rapidly filled with pressurizing fluid. For the most part, the valve is free of friction forces, so that it works not only with low wear effect, but also precisely and with little delay.

If no special importance is attributed to a correspondingly rapid venting, then the valve as in FIGS. 1 to 4 will suffice by its best adaptation to the adjusted conditions, as is especially shown from the above constructions.

Rapid venting corresponding with the rapid entrainment can therefore also be attained by the relatively simple further construction shown in FIGS. 5 and 6.

With this embodiment, pressure medium inlet 8 and pressure medium output 18 are coaxial with each other, so that their lengthwise axes intersect the lengthwise axis of supply chamber 7.

Coaxial with the top pressure medium discharge opening between control piston 3 and bore wall 30, at the other end of housing 1, another pressure medium discharge opening 15 is provided, of which the section corresponds at least approximately to the section of pressure medium inlet 9 and pressure medium output 18. The inside end of the second pressure medium discharge opening is surrounded by a collar 42, which has a relatively large surface perpendicular to the lengthwise axis of chamber 7. A venting disk 13, again fabricated of an elastomeric, material, is arranged over this collar 42. The venting disk is naturally flat, but is deformed by the flow pressure of the fluid. This disk 13 can be adjusted between collar 42 and the edge 27 facing this collar at the inside end of supply chamber 7, lengthwise to chamber 7. If utilization device 19 is to be pressured in the described manner, then the pressure in inside space 35 places disk 13 on collar 42 and pressure fluid passes through a working chamber 16 into pressure medium output 18 (FIG. 6). If the control force is decreased on control piston 3 for the venting of device 19 in the aforementioned manner, and then drops through the pressure fluid which escapes from the inside space through the annular clearance between control piston 33 and bore wall 30, the pressure in inside space 35 drops below the pressure level in pressure medium output 18, and then the fluid being discharged from utilization device 19 will lift disk 13 from collar 42, and in a practical sense, a sudden drop of pressure occurs in the utilization device, which is even desirable, with certain devices, causing a rapid entrainment. In the constuction according to the invention, this advantage is also attained in a simple manner.

Because of the simple assembly and disassembly of the valve, collar 42 is part of a floor 14, which closes housing 1 at one end, surrounds the pressure medium discharge opening 15 and is held between a security ring 12 and a collar of the housing with insertion of a tapered gasket 11.

It is obvious that supply chamber 7, with sections 7a, 7b, is part of a bore which passes through housing 1 in vertical direction in the drawing, and becomes smaller in cross section in steps from both outside ends inward, and has the advantage that its manufacture can be simple and low cost, and a simple manufacturing mold can be used.

I claim:

1. A force-controlled pressure regulating valve, including a housing having a pressure medium inlet opening connected to a pressure medium source, a pressure medium output opening connected to a utilization device, and a venting opening, which leads to a low pressure medium, and a valve member, adjustable between two end positions, for connecting the pressure medium output opening either to the pressure medium inlet, when the venting opening is blocked, or to the venting opening, when the pressure medium inlet opening is blocked, characterized in that the housing includes a chamber which is permanently connected to the pressure medium inlet opening and blocked against the pressure medium output opening, said valve member being guided radially without play within said housing and being configured as a hollow cylinder, said housing including an opening connected to the pressure medium outlet opening and valve seat coaxial with the venting opening, and said valve member further comprising a cover which defines a second valve seat, one edge of said cylinder surrounding the opening connected with the pressure medium output opening, and the other edge of said cylinder cooperating with the first valve seat coaxial with the venting opening, and surrounding the second valve seat in the cover of said valve member, said valve further comprising a control member, arranged within the venting opening and including an annular edge, for applying a setting force on the valve member through the valve member cover by means of said annular edge to as to connect an inside space within the housing to the pressure medium inlet opening when the venting opening is closed, and means for producing a resetting force, during the setting of the valve member under the influence of the setting force, which acts in opposition to this setting force such that, when the seetting force is exceeded, said other edge of the valve member is reseated on said first valve seat.

2. Pressure regulating valve as in claim 1, characterized in that the resetting force acts on a diameter of valve member which is identical to the diameter of the edge of the valve member cooperating with the first valve seat.

3. Pressure regulating valve as in claim 1, characterized in that the means for producing said resetting force comprises an elastic gasket ring located in the housing chamber which blocks the housing chamber against the pressure medium output opening of the valve housing.

4. Pressure regulating valve as in claim 3, characterized in that the gasket ring is disposed near said one edge of said valve member which surrounds the opening connected permanently to the pressure medium output opening.

5. Pressure regulating valve as in claim 1, characterized in that the second valve seat of the valve member is arranged in the cover within a ring of openings in said cover which connect the inside space of the valve member permanently with a chamber formed within said other edge of the valve member.

6. Pressure regulating valve as in claim 1, characterized in that the first valve seat is provided on a perforated disk supported in the housing, said disk including a central hole which is coaxial with the second valve seat and with the edge of the control member cooperating with the second valve seat.

7. Pressure regulating valve as in claim 6, characterized in that the second valve set lies in a plane perpendicular to the lengthwise axis of the valve member, in which said other edge of the valve member cooperating with the first valve seat and the area of the disk surrounding the central hole of the perforated disk are elastically deformable, so that when the control member is brought near the second valve seat, thereby blocking said venting opening, said control member is caused to move by the resetting force in a direction releasing the venting opening and said area of said disk is able to freely follow this movement of the control member.

8. Pressure regulating valve as in claim 1, characterized in that the resetting force acts on a conical surface area of the valve member located between two cylindrical sections of the valve member.

9. Pressure regulating valve as in claim 4, characterized in that rigid guide projections on the valve member serve as radial guides to guide the valve member in the housing chamber, in cooperation with the wall of the housing chamber.

10. Pressure regulating valve as in claim 1, characterized in that the housing chamber is part of a stepped bore of the housing, wherein the sections form the pressure medium output opening, and the housing chamber is divided into two sections which form a section including the cover including said venting opening, and the section diameters of the bore decrease from both ends inward.

11. Pressure regulating valve as in claim 1, characterized in that the venting opening alone serves to provide for escape of the pressure medium from inside space of the valve member, while during discharge from the utilization device, the pressure medium is discharged from the valve housing through a substantially larger second venting opening.

12. Pressure regulating valve as in claim 11, characterized in that the second venting opening is closed and opened by an adjustable diaphragm disk.

13. Pressure regulating valve as in claim 12, characterized in that the setting movements of the diaphragm disk are controlled by the pressure medium being discharged from the inside space of the valve member to the utilization device and by the pressure medium being discharged from the utilization device.

14. Pressure regulating valve as in claim 13, characterized in that the diaphragm disk cooperates with a collar surrounding the second venting opening.

15. Pressure regulating valve as in claim 1, characterized in that the diameter of said other edge of the valve member cooperating with the first valve seat is substantially greater than the diameter of the edge of the control member cooperating with the second valve seat.

16. Pressure regulating valve as in claim 1, characterized by the use of air as a pressure medium and, wherein the low pressure area is the surrounding atmosphere.

17. A pressure regulating valve as in claim 16, for compressed air brakes in vehicles.

* * * * *